June 26, 1962

L. SCHMIEDEL 3,040,893

SCREENING OF THIN STARCH PASTE

Filed Dec. 26, 1956

INVENTOR
LUDWIG SCHMIEDEL

BY Watson, Cole, Grindle & Watson

ATTORNEYS

United States Patent Office 3,040,893
Patented June 26, 1962

3,040,893
SCREENING OF THIN STARCH PASTE
Ludwig Schmiedel, Wunstorf-Hannover, Germany, assignor to Starcosa Maschinen- und Apparatebau G.m.b.H., Wunstorf-Hannover, Germany
Filed Dec. 26, 1956, Ser. No. 630,553
Claims priority, application Germany Jan. 9, 1956
4 Claims. (Cl. 210—66)

This invention concerns improvements relating to the screening of thin starch pastes, or "starch milk," and to apparatus particularly suitable for this purpose.

For the separation of fine fibres from the thin starch paste resulting from the washing out of the starch from the ground substance of the raw material, use is made nowadays exclusively of screening devices such as shaking screens or rotating round or hexagonal screens. For this separation of the fibres, depending on the nature of the starch, a very fine screen covering, for example silk gauze of gauges Nos. 12 to 20, is necessary. These screening devices require a great deal of space, as very large screening surfaces are necessary. In particular, however, they suffer from the disadvantage that the covering becomes so clogged with fine fibres after a comparatively short time, say in 8 to 24 hours depending upon the nature of the starch, that the screening frames have to be removed and cleaned.

It is an object of the invention to obviate these disadvantages by a simple but effective method and apparatus.

According to the invention, a method of screening a thin starch paste comprises treating starch liquid by means of a washing device comprising a rotating screening drum and jet nozzles rotating inside the said drum and with a relative speed of rotation with respect thereto, the said starch liquid being supplied to the said nozzles and sprayed by them on to the screening surface of the said drum.

Whereas in centrifugal devices proposed hitherto for washing the starch out from the ground material, the latter was introduced into a screening drum and washing water was supplied to spray nozzles, according to the invention the fibre-containing thin starch paste is supplied to the nozzles and is applied by the latter to the screening surface.

One manner of carrying the invention into effect will now be described by way of example and with reference to the accompanying diagrammatic drawings, in which.

Figure 1:
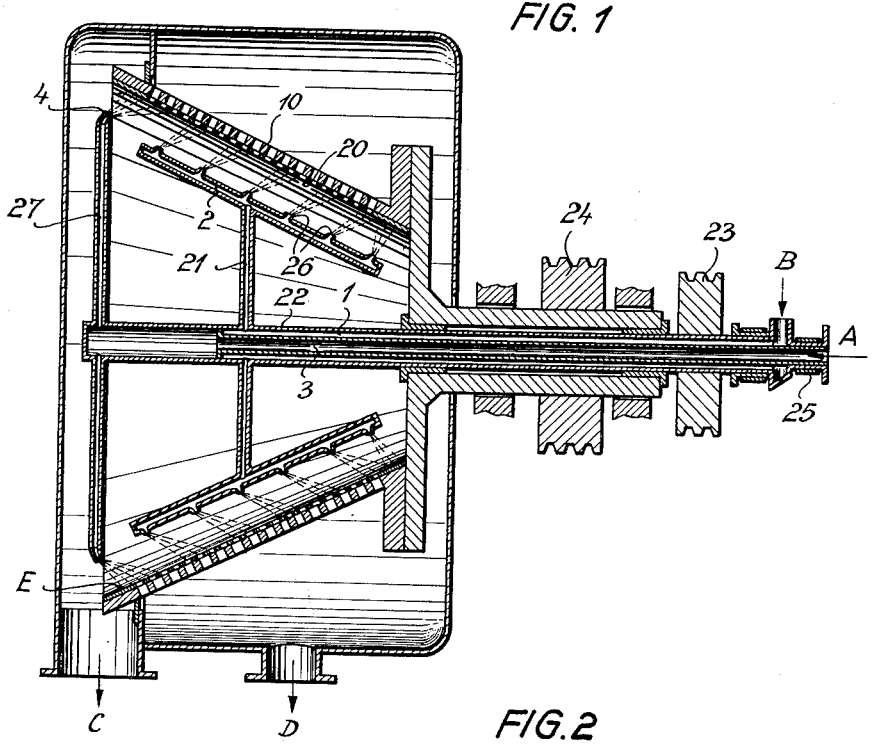
FIGURE 1 is a longitudinal section through a centrifugal screening device.
Figure 2:
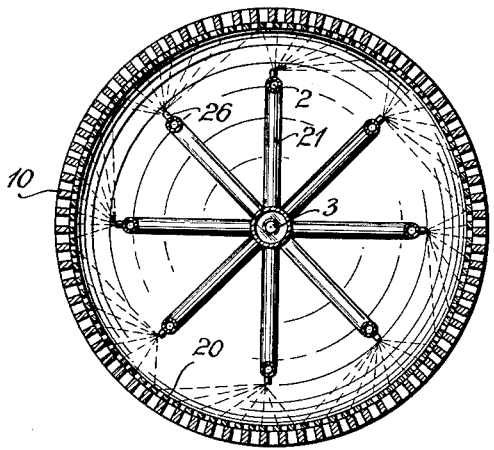
FIGURE 2 is a cross-section through the screening drum of the said device.

Arranged inside an enclosed rotating drum 10 provided with a screen or screens 20 is a spraying or sprinkling nozzle system 2 which is furnished with nozzles 26 and which rotates with a relative speed of rotation with respect to the drum itself. Arms 2 carrying the nozzles 26 are mounted by transverse supply ducts 21 on a tube 22 which is driven through a pulley or gearwheel 23, whilst the drum 10 with the screen 20 is driven through a pulley or wheel 24. The tube 22, which thus also serves as a shaft, carries a stationary feed member 25 at the right-hand end.

The fine starch paste or "milk" to be screened is supplied, for the screening operation, at B to an annular passage 1 formed between the tube 22 and a concentric inner tube 3 and passes therefrom through the ducts 21 into the nozzle system 2. The nozzles 26 spray the starch paste on to the screening surface 20 and this is accomplished by directing the nozzles 26 as shown so that they will spray the starch liquid to be washed in a direction against the direction of passage of the liquid on the screening surface of the drum. The fabric covering of the latter is made so fine that only the liquid passes through it together with the starch, whereas the fibres contained in the paste remain on the fabric. With a frusto conical screening drum such as is shown, due to the action of the centrifugal force, the fibres move of their own accord towards the end E of the drum and are discharged at C. On account of the relative movement between the jets and the drum, the fine fibres are constantly sprayed afresh during their passage over the said drum and are thereby prevented from settling on the screening surface. Thus the nozzles continuously clean the said surface. With screening drums which are only slightly conical or are cylindrical, appropriately directed jets of inflowing starch paste may be arranged to effect the conveyance of the fine fibres to the discharge end of the drum.

In most cases, it will be necessary further to wash out the fine fibres before they leave the screening surface in order to separate residual adhering starch particles from the fibres.

In the example illustrated, fresh water is used for this purpose. This is fed at A into the inner tube 3 and passes through the latter to separate washing nozzles 4 mounted on transverse ducts 27 in direct communication with the said tube 3. The nozzles 4 spray the fine fibres with fresh water before they are discharged and thus wash out the final residues of starch from the fibres.

I claim:

1. A machine for screening a starch liquid comprising a rotating drum provided with a screen and having a frusto-conical shape with a closed end at one end thereof and having the larger end thereof open, means for rotatably mounting the drum, and a pair of coaxially arranged tubes having a plurality of nozzles connected to one tube arranged to spray the starch liquid along the internal surface of the drum directed upstream with respect to the flow of material thereby checking said flow and the other tube having a plurality of nozzles to direct water on the internal open end surface at the other end of the drum.

2. A machine according to claim 1, in which a disk is provided to close the closed end of the drum and having an extension sleeve to act as a bearing for the drum and through which the coaxial tubes pass.

3. A method of screening a thin starch fluid by means of a washing device having a frusto-conical screening drum and jet nozzles inside said drum, comprising the steps of rotating said screening drum whereby liquid on the inner surface of said drum will flow in one direction to an open end of said drum, rotating the jet nozzles with a relative speed with respect to the drum, directing the thin starch liquid by said jet nozzle obliquely on the entire inner surface of said drum against said one direction whereby the flow of the liquid on the screening surface of the drum will be checked.

4. The method according to claim 3, in which the step is added of further washing the starch liquid before leaving the screening drum by additional nozzles directing washing liquid from inside the drum near the screening drum directly and obliquely upon the drum.

References Cited in the file of this patent
UNITED STATES PATENTS

| | | |
|---|---|---|
| 535,306 | Stewart | Mar. 5, 1895 |
| 962,052 | Roberts | June 21, 1910 |
| 1,000,540 | Neikirk | Aug. 15, 1911 |
| 1,101,548 | Hoffman | June 30, 1914 |
| 1,212,831 | Spelman | Jan. 16, 1917 |
| 2,096,594 | Sanchez | Oct. 19, 1937 |
| 2,416,073 | Smely | Feb. 18, 1947 |
| 2,857,053 | Schmiedel | Oct. 21, 1958 |

Dedication 3,040,893.—*Ludwig Schmiedel*, Wunstorf-Hannover, Germany. SCREENING OF THIN STARCH PASTE. Patent dated June 26, 1962. Dedication filed June 25, 1975, by the assignee, *Starcosa GmbH*.
Hereby dedicates the remaining term of said patent to the Public.
[*Official Gazette March 9, 1976.*]